US012439304B2

(12) United States Patent
Ao et al.

(10) Patent No.: US 12,439,304 B2
(45) Date of Patent: Oct. 7, 2025

(54) METHOD AND SYSTEM FOR AUTOMATICALLY MEASURING HANDOVER PERFORMANCE IN A MULTI-CELL ENVIRONMENT

(71) Applicant: Alpha Networks Inc., Hsinchu (TW)

(72) Inventors: Shih-Fang Ao, Hsinchu (TW);
An-Cheng Tseng, Hsinchu (TW);
Jen-Hung Yang, Hsinchu (TW)

(73) Assignee: Alpha Networks Inc., Hsinchu (TW)

( * ) Notice: Subject to any disclaimer, the term of this patent is extended or adjusted under 35 U.S.C. 154(b) by 323 days.

(21) Appl. No.: 18/449,998

(22) Filed: Aug. 15, 2023

(65) Prior Publication Data
US 2024/0064590 A1 Feb. 22, 2024

(30) Foreign Application Priority Data
Aug. 17, 2022 (TW) .................................. 111130932

(51) Int. Cl.
*H04W 36/00* (2009.01)
(52) U.S. Cl.
CPC ............................. *H04W 36/00833* (2023.05)
(58) Field of Classification Search
CPC ......... H04W 36/0016; H04W 36/0033; H04W 36/0088; H04W 36/06; H04W 36/00833; H04W 16/28; H04W 48/12; H04W 52/0206; H04W 16/02; H04W 16/12; H04W 48/20
See application file for complete search history.

(56) References Cited

U.S. PATENT DOCUMENTS

| | | | |
|---|---|---|---|
| 2002/0187812 A1* | 12/2002 | Guo ..................... | H04B 7/0634 455/562.1 |
| 2007/0249400 A1* | 10/2007 | Kaneko ................ | G01S 3/66 455/562.1 |
| 2014/0073329 A1* | 3/2014 | Kang ................... | H04W 36/30 455/439 |
| 2016/0007261 A1* | 1/2016 | Oh ....................... | H04B 7/0695 455/438 |
| 2021/0095464 A1* | 4/2021 | Bucur .................. | H04W 88/08 |
| 2022/0338076 A1* | 10/2022 | Yan .................. | H04W 36/00835 |
| 2025/0203467 A1* | 6/2025 | Gundogan ........... | H04W 36/085 |

* cited by examiner

*Primary Examiner* — Allahyar Kasraian
(74) *Attorney, Agent, or Firm* — Blank Rome LLP

(57) ABSTRACT

A method for automatically measuring a handover performance in a multi-cell environment includes: by a base station device, transmitting a radio frequency (RF) signal; rotating by one full rotation; receiving a first measurement dataset from a user equipment (UE); obtaining a first trigger value and a second trigger value based on the first measurement dataset, and calculating a third trigger value based on the second trigger value and a preset third event offset value; transmitting a plurality of RF signals; rotating by a preset angle with a preset angular velocity; receiving a second measurement dataset from the UE; transmitting a command to the UE to perform a handover process; and measuring a plurality of results associated with the handover process. The results include a handover time during which the handover process is implemented and completed, and a success rate of the handover process.

13 Claims, 9 Drawing Sheets

METHOD AND SYSTEM FOR AUTOMATICALLY MEASURING HANDOVER PERFORMANCE IN A MULTI-CELL ENVIRONMENT

CROSS-REFERENCE TO RELATED APPLICATION

This application claims priority to Taiwanese Invention Patent Application No. 111130932, filed on Aug. 17, 2022.

FIELD

The disclosure relates to a method and a system for automatically measuring a handover performance in a multi-cell environment.

BACKGROUND

Currently, as mobile electronic devices supporting cellular communications have been very commonly used worldwide, an effectiveness of a handover process, in which an ongoing call or data session is transferred from one base station to another base station while a mobile electronic device moves from one area to another, has been an important aspect for the mobile electronic device.

Typically, the effectiveness of the handover process associated with a mobile electronic device may be measured manually in a verification procedure as depicted below. In the procedure, a multi-cell environment may be set up using a plurality of cellular base stations (e.g., two). The cellular base stations are separated from each other and each of the cellular base stations is configured to create a cell, which is a geographical area in which the mobile electronic device is enabled to perform cellular communication through antennas included in the cellular base station. In the example of a two-cell environment, two cells created by the two cellular base stations are adjacent to each other. In use, the mobile electronic device is moved (by a person who holds the mobile electronic device or by a carrier on which the mobile electronic device is placed) from one of the cells to the other of the cells, which triggers the mobile electronic device to initiate the handover. Moving the mobile electronic device from one cell to the other cell is performed at various speeds (e.g., three different speeds). Under each speed, a measurement of data throughput associated with the mobile electronic device throughout the movement is recorded. These measurements are then used to determine the effectiveness of the handover.

SUMMARY

A more time- and labor-effective manner of implementing the verification procedure may be desirable. Therefore, one object of the disclosure is to provide a method that is more effective than the prior art.

According to one embodiment of the disclosure, there is provided a method of automatically measuring a handover performance in a multi-cell environment. The method is implemented by a system that includes a rotating device, a user equipment (UE) disposed in proximity to the rotating device, and a base station device disposed on the rotating device. The base station device includes a number N of directional antennas, a signal transceiver unit and a processor. The number N of directional antennas are associated with a number N of cells, respectively. Each of the number N of directional antennas being configured to emit a signal wave beam in a specific direction. The directional antennas are disposed in a manner such that lines defined by the signal wave beams emitted by two adjacent directional antennas form a preset angle of 360/N degrees N, being an integer no smaller than 2. The UE is placed within one of the cells which serves as a serving cell. The rotating device being in an initial angular position when the method commences. The method includes:

a) by the processor, controlling the signal transceiver unit to activate one of the directional antennas that is associated with the serving cell, so as to control the one of the directional antennas to transmit a radio frequency (RF) signal;

b) by the processor, controlling the rotating device to make one full rotation;

c) by the processor, receiving a first measurement dataset from the UE, the first measurement dataset being associated with a reference signal receiving power (RSRP) of the RF signal measured by the UE, and including a number M of measurement data points, wherein M is an integer and equals 360/m, m represents a rotation angle, and the UE is configured to generate one measurement data point whenever the rotating device rotates by m degrees;

d) by the processor, obtaining a first trigger value that is associated with triggering of a first event and a second trigger value that is associated with triggering of a second event based on the first measurement dataset, and calculating a third trigger value that is associated with triggering of a third event based on the second trigger value and a preset third event offset value, wherein the first event is where the UE stops measuring an RSRP from a neighbor cell, the second event is where the UE starts measuring the RSRP from the neighbor cell, and the third event is where the UE starts a handover process when it is determined that the RSRP associated with the neighbor cell is equal to or larger than the third trigger value, the neighbor cell being another one of the cells other than the serving cell;

e) by the processor, controlling the signal transceiver unit to activate all of the directional antennas, so as to control all of the directional antennas to transmit the RF signals;

f) by the processor, controlling the rotating device to perform a partial rotation, in which the rotating device rotates by the preset angle with a preset angular velocity;

g) by the processor, receiving a second measurement dataset from the UE, the second measurement dataset being associated with the RSRP of at least one of the RF signals as measured by the UE;

h) by the processor, transmitting a command to the UE to cause the UE to perform one of the first event, the second event and the third event based on the second measurement dataset, the first trigger value, the second trigger value and the third trigger value;

i) by the processor, in a case where the command is to cause the UE to perform the third event, measuring a plurality of results associated with the handover process of the UE, the results including a handover time during which the handover process is implemented and completed, and a success rate associated with the handover process.

Another object of the disclosure is to provide a system that is configured to implement the above-mentioned method.

According to one embodiment of the disclosure, there is provided a system for automatically measuring a handover performance in a multi-cell environment. The system includes a rotating device, a user equipment (UE) disposed in proximity to the rotating device, and a base station device disposed on the rotating device. The base station device includes a number N of directional antennas, a signal transceiver unit, and a processor.

The number N of directional antennas are associated with a number N of cells, respectively. Each of the number N of directional antennas is configured to emit a signal wave beam in a specific direction. The directional antennas are disposed in a manner such that lines defined by the signal wave beams emitted by two adjacent directional antennas form a preset angle of 360/N degrees, N being an integer no smaller than 2. The UE is placed within one of the cells which serves as a serving cell, the rotating device is initially in an initial angular position.

The processor is configured to control the signal transceiver unit to activate one of the directional antennas that is associated with the serving cell, so as to control the one of the directional antennas to transmit a radio frequency (RF) signal, and to control the rotating device to make one full rotation.

The UE is configured to measure a reference signal receiving power (RSRP) of the RF signal, to generate a first measurement dataset associated with the RSRP of the RF signal measured by the UE, and to transmit the first measurement dataset to the base station device, the first measurement dataset including a number M of measurement data points, wherein M is an integer and equals 360/m, m represents a rotation angle, and the UE is configured to generate one measurement data point whenever the rotating device rotates by m degrees.

The processor is configured to obtain a first trigger value that is associated with triggering of a first event and a second trigger value that is associated with triggering of a second event based on the first measurement dataset, and to calculate a third trigger value that is associated with triggering of a third event based on the second trigger value and a preset third event offset value, wherein the first event is where the UE stops measuring an RSRP from a neighbor cell, the second event is where the UE starts measuring the RSRP from the neighbor cell, and the third event is where the UE starts a handover process when it is determined that the RSRP associated with the nearby cell is equal to or larger than the third trigger value, the neighbor cell being another one of the cells other than the serving cell.

The processor is configured to control the signal transceiver unit to activate all of the directional antennas, so as to control all of the directional antennas to transmit the RF signals, and to control the rotating device to perform a partial rotation, in which the rotating device rotates by the preset angle with a preset angular velocity.

The UE is configured to measure the RSRP of at least one of the RF signals, to generate a second measurement dataset associated with the RSRP of at least one of the RF signals as measured by the UE, and to transmit the second measurement dataset to the base station device.

The processor is configured to transmit a command to the UE to cause the UE to perform one of the first event, the second event and the third event based on the second measurement dataset, the first trigger value, the second trigger value and the third trigger value, and in a case where the command is to cause the UE to perform the third event, to measure a plurality of results associated with the handover process of the UE, the results including a handover time during which the handover process is implemented and completed, and a success rate associated with the handover process.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
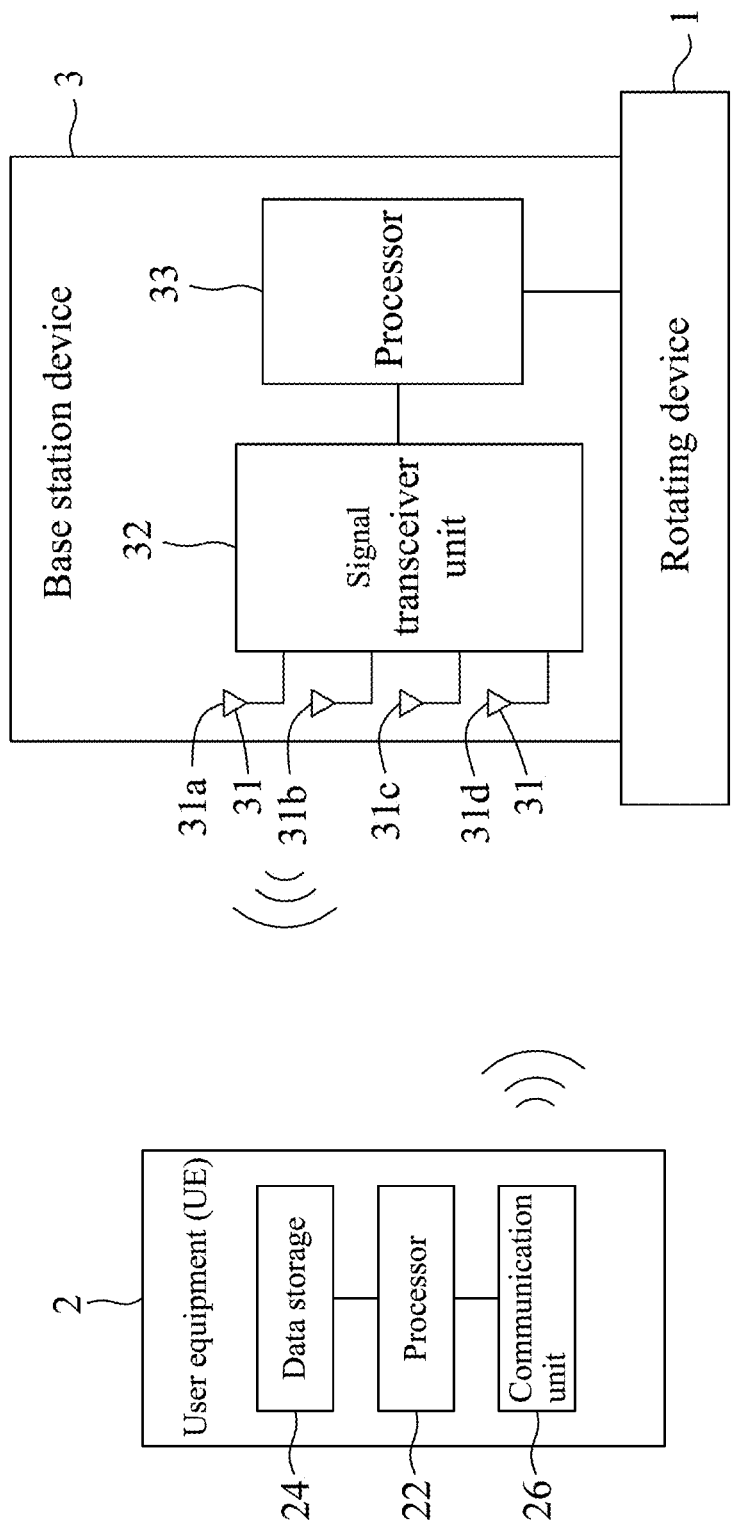
FIG. 1 illustrates a system for automatically measuring a handover performance in a multi-cell environment according to one embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

FIG. 1 illustrates a system for automatically measuring a handover performance in a multi-cell environment according to one embodiment of the disclosure. In this embodiment, the system includes a rotating device 1, a user equipment (UE) 2 to be tested and disposed in proximity to the rotating device 1, and a base station device 3 disposed on the rotating device 1.

Figure 2:
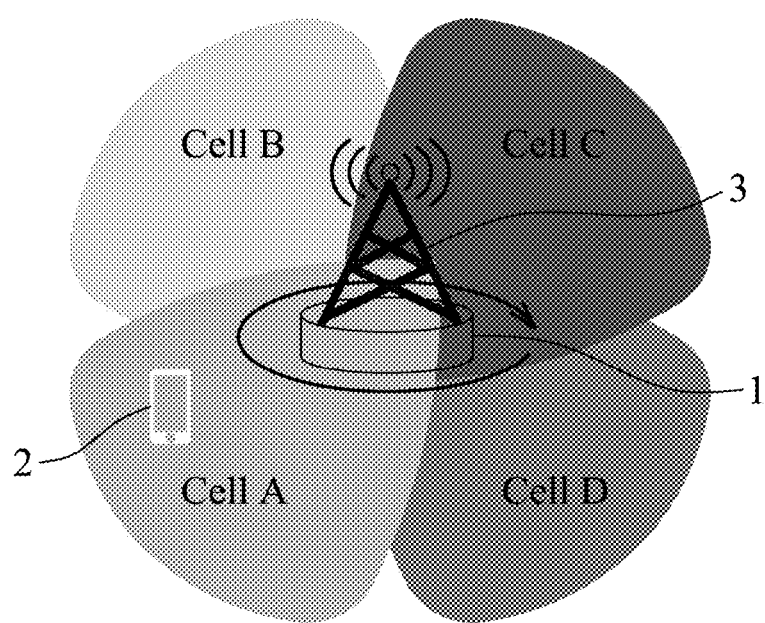
FIG. 2 illustrates an arrangement of elements that are included in the system according to one embodiment of the disclosure.

FIG. 2 illustrates an arrangement of elements that are included in the system according to one embodiment of the disclosure. In the embodiment of FIG. 2, the rotating device 1 may include a round plate that is controlled to rotate, a controller, and a rotating mechanism that is connected to the controller and the round plate (not depicted in the drawings). The controller may include software instructions for controlling the rotating mechanism. Upon receipt of the instructions, the rotating mechanism is controlled to rotate the round plate in a controlled manner (e.g., rotating at a designated angular velocity, rotating by a specific angle, etc.). It is noted that other configurations for the rotating device 1 may be employed in different embodiments, and this disclosure is not limited to the configuration as described above.

The UE 2 may be embodied using, for example, a mobile communication device, a modem, a cellular phone, a gaming electronic device, a navigation device, a laptop, a tablet, a smart gadget, or any other electronic device that is portable and that supports cellular telecommunications. The UE 2 includes a processor 22, a data storage 24 and a communication component 26.

The processor 22 may include, for example but not limited to, a single core processor, a multi-core processor, a dual-core mobile processor, a microprocessor, a microcontroller, a digital signal processor (DSP), a field-programmable gate array (FPGA), an application specific integrated circuit (ASIC), and/or a radio-frequency integrated circuit (RFIC), etc.

The data storage 24 is connected to the processor 22, and may be embodied using, for example, random access memory (RAM), read only memory (ROM), programmable ROM (PROM), firmware, and/or flash memory, etc. The data storage 24 stores a software application including instructions that, when executed by the processor 22, cause the processor 22 to perform operations as described below.

The communication unit 26 is connected to the processor 22, and may include one or more of a radio-frequency integrated circuit (RFIC), a short-range wireless communication module supporting a short-range wireless communication network using a wireless technology of Bluetooth® and/or Wi-Fi, etc., and a mobile communication module supporting telecommunication using Long-Term Evolution (LTE), the third generation (3G), the fourth generation (4G) or fifth generation (5G) of wireless mobile telecommunications technology, or the like.

The base station device 3 is disposed on the rotating device 1, may be embodied using a commercially available base station simulator (also known as a signal tester), and includes a number N of directional antennas 31, a signal transceiver unit 32, and a processor 33. In the embodiment of FIG. 2, the UE 2 is disposed a predetermined distance away from the base station device 3 on the rotating device 1 (e.g., 1 meter, but other distances may be employed as well). In the embodiment of FIG. 1, the base station device 3 is configured to provide a 5G new radio access network (5G-NR), and the UE 2 is configured to support communication via the 5G new radio access network, but is not limited to such.

In embodiments, the number N is an integer no smaller than 2. In the embodiment of FIG. 1, the number N equals 4, and the directional antennas 31 are labeled 31a, 31b, 31c and 31d, respectively. Each of the number N of directional antennas 31 is configured to emit a signal wave beam in a specific direction. That is to say, the signal wave beam emitted by a specific directional antenna 31 may define a straight line.

In some embodiments, the directional antennas 31 are disposed in a manner such that lines defined by the signal wave beams emitted by two adjacent directional antennas 31 form a preset angle of 360/N degrees. In the embodiment of FIG. 2, one of the directional antennas 31 (e.g., the directional antenna 31a) is disposed such that the line defined by the signal wave beam emitted by the one of the directional antennas 31 extends toward the UE 2 or is near the UE 2, and lines defined by the signal wave beams emitted by two adjacent directional antennas 31 form a preset angle of 90 degrees.

Each of the directional antennas 31 is configured to, through the signal wave beam, provide services in a cell, which is a geographical area in which the UE 2 is enabled to perform cellular communication through one of the directional antennas 31 included in the base station device 3. In the embodiment of FIG. 2, four cells are created, are labeled Cell A, Cell B, Cell C and Cell D, respectively (see FIG. 2), and are associated with the directional antennas 31a, 31b, 31c and 31d, respectively. The base station device 3 is capable of generating a multi-cell environment. The UE 2 is placed within Cell A at this moment, and cellular communication of the UE 2 is served within Cell A, in which case Cell A serves as a serving cell.

The signal transceiver unit 32 is coupled to the directional antennas 31, and includes a receiver, a transmitter, a converting unit that includes an analog-to-digital (A/D) converter and a digital-to-analog (D/A) converter, and other components for maintaining operation of the signal transceiver unit 32. In use, as the UE 2 is coupled to one of the directional antennas 31, the base station device 3 is configured to continuously transmit a downlink signal to the UE 2 using the directional antennas 31, and the UE 2 is configured to receive the downlink signal, measure a downlink signal strength (i.e., a reference signal receiving power (RSRP)) associated with the downlink signal, and continuously transmit a feedback signal to the signal transceiver unit 32 of the base station device 3 to report the RSRP. In embodiments, the feedback signal includes the RSRP that is associated with the downlink signal and that is measured by the UE 2.

It is noted that the operations of the signal transceiver unit 32 and the communications between the UE 2 and the base station device 3 are readily known in the relevant field, and therefore, details thereof are omitted herein for the sake of brevity.

The processor 33 is coupled to the rotating device 1 and the signal transceiver unit 32, and may include, for example but not limited to, a single core processor, a multi-core processor, a dual-core mobile processor, a microprocessor, a microcontroller, a digital signal processor (DSP), a field-programmable gate array (FPGA), an application specific integrated circuit (ASIC), and/or a radio-frequency integrated circuit (RFIC), etc. The processor 33 is configured to execute a software application stored in a memory device (not depicted in the drawings) that may be a built-in component of the processor 33, so as to control the operations of the rotating device 1 and the signal transceiver unit 32.

In some embodiments, the base station device 3 further includes one or more of a data storage, a display and a user interface (not depicted in the drawings). The data storage may be built in the processor 33 or be a separate component that is connected to the processor 33. The display and the user interface may be integrated into a touchscreen, but are not limited to such. In embodiments, data received by the base station device 3 and various data measured and/or calculated by the processor 33 may be stored in the data storage, and the content stored in the data storage may be accessed by a person operating the user interface and be displayed by the display.

In some embodiments, the processor 33 may be switched to operate in one of an initial mode and a handover mode. In the initial mode, the processor 33 receives a first measurement dataset from the UE 2, and obtains a first trigger value and a second trigger value based on the first measurement dataset. The first trigger value is associated with triggering of a first event, which is where the UE 2 stops measuring a transmitting signal strength (i.e., an RSRP) from a neighbor cell (e.g., one of the four cells that is not the serving cell, which may be one of Cell B, Cell C and Cell D in the embodiment of FIG. 2). The second trigger value is associated with triggering of a second event, which is where the UE 2 starts to measure the RSRP from the neighbor cell. The processor 33 is further configured to calculate a third trigger value based on the second trigger value and a preset third event offset value. The third trigger value is associated with triggering of a third event, which is where the UE 2 starts a handover process when it is determined that the RSRP associated with the neighbor cell is equal to or larger than the third trigger value.

In the handover mode, the processor 33 transmits a command to the UE 2 to cause the UE 2 to perform one of the first event, the second event and the third event. Additionally, while the UE 2 is performing the third event, the processor 33 measures a plurality of results associated with the handover process of the UE 2, and stores these results. In embodiments, the results may include a handover time during which the handover process is implemented and completed, a success rate associated with the handover process, data throughput (or simply, throughput) during the handover process, etc.

Figure 3:
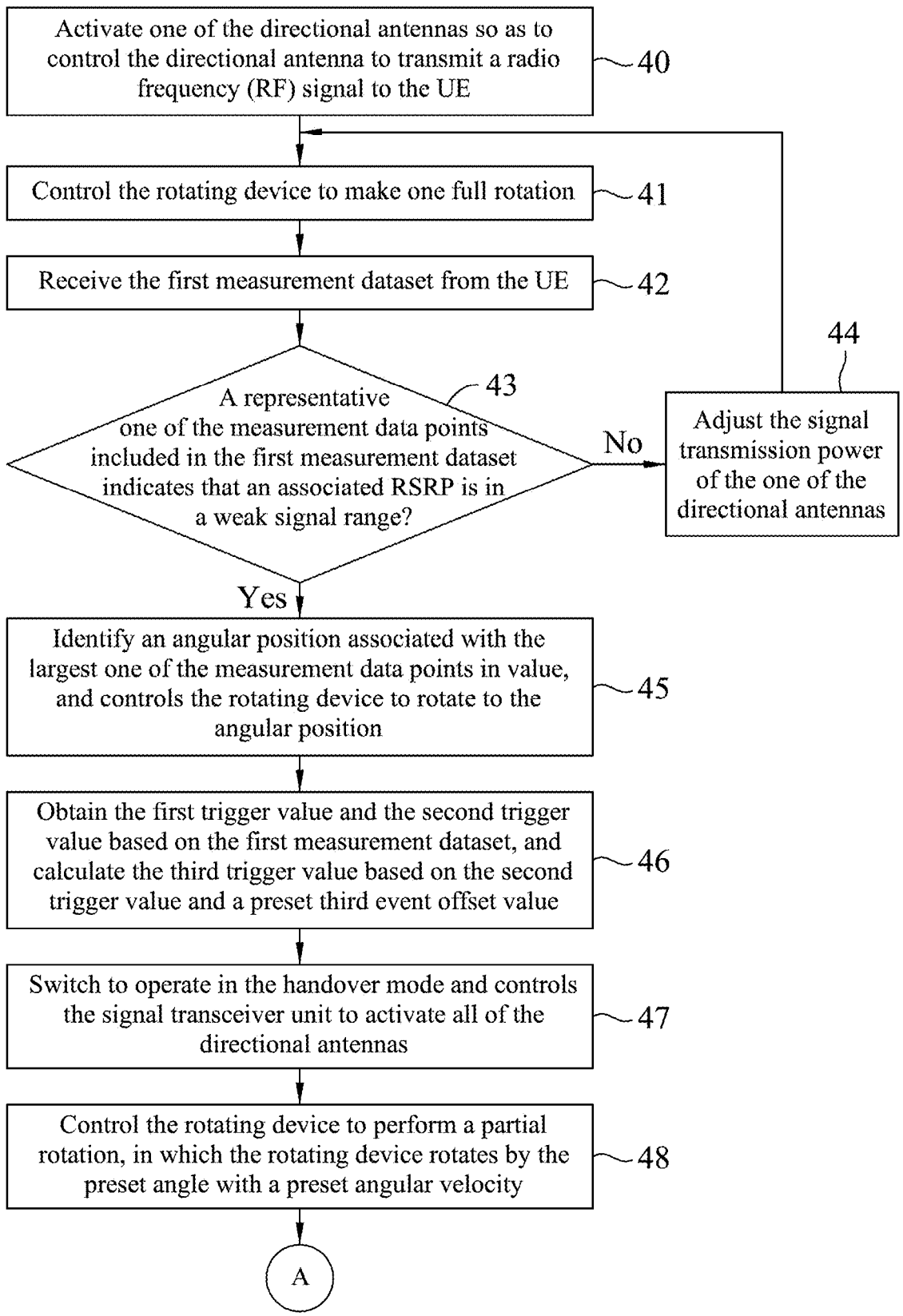
FIGS. 3 and 4 are flow charts illustrating steps of a method for automatically measuring a handover performance in a multi-cell environment according to one embodiment of the disclosure.
Figure 4:
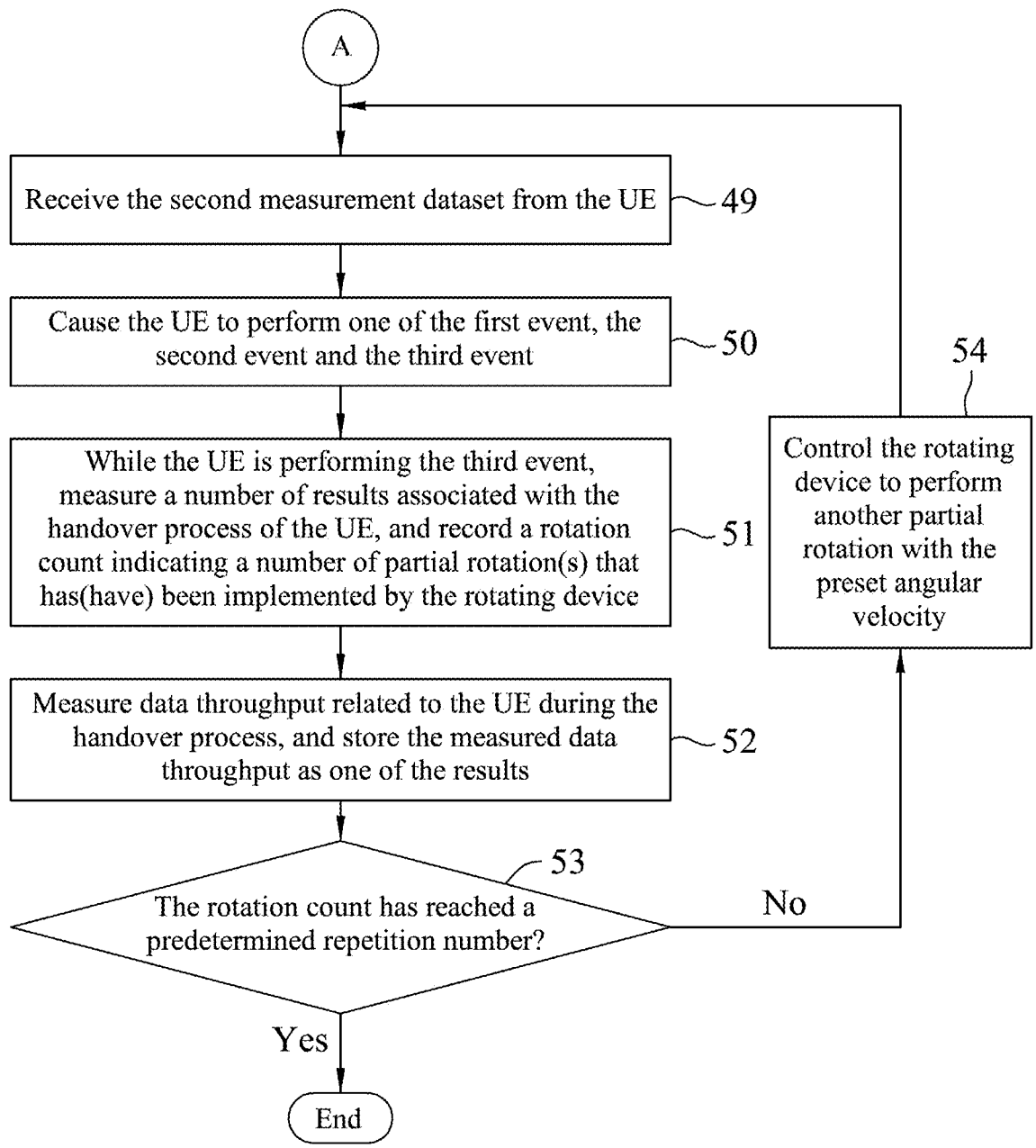

FIGS. 3 and 4 are flow charts illustrating steps of a method for automatically measuring a handover performance in a multi-cell environment according to one embodiment of the disclosure. In this embodiment, the method is implemented using the system of FIGS. 1 and 2.

In use, before starting the method, the UE 2 is placed within one of the cells (e.g., Cell A), which is associated with one of the directional antennas 31 (e.g., the directional antenna 31*a*), and the rotating device 1 is in an initial angular position. Then, to start the method, a person controlling the system may operate the base station device 3 (using a built-in interface or a remote electronic device) to cause the processor 33 to execute a software application to perform the following steps.

In step 40, the processor 33 controls the signal transceiver unit 32 to activate one of the directional antennas 31 (e.g., the directional antenna 31*a*), so as to control the directional antenna 31*a* to transmit a radio frequency (RF) signal to the UE 2. In the meantime, the UE 2 is controlled to continuously or periodically measure a reference signal receiving power (RSRP) associated with the RF signal. In this embodiment, the UE 2 periodically measures the RSRP associated with the RF signal.

In step 41, the processor 33 controls the rotating device 1 to make one full rotation (i.e., rotate by 360 degrees), that is, to rotate clockwise or counterclockwise by 360 degrees, and return to the initial angular position. It is noted that the base station device 3 is driven by the rotating device 1 to rotate, and, as a result, the relative positions of each of the directional antennas 31 and the UE 2 change during the rotation.

During the rotation, the UE 2 periodically measures the RSRP associated with the RF signal, and generates a first measurement dataset. In embodiments, the UE 2 measures the RSRP associated with the RF signal once every time the rotating device 1 rotates by a preset angle of m degrees, and generates a measurement data point that records the RSRP thus measured and the angular position at which the RSRP is measured. That is to say, after the rotating device 1 made one rotation, a number of M measurement data points are generated to constitute the first measurement dataset associated with the RSRPs measured by the UE 2. In embodiments, the number M equals 360/m, M is an integer, and M/N is set to be an integer. In this embodiment, the number m equals and indicates a rotation angle associated with the measurement of the UE 2, M equals 24, and M/N equals 6. Specifically, whenever the rotating device 1 rotates by 15 degrees, the UE 2 measures the RSRP associated with the RF signal and generates one measurement data point. That is to say, the UE 2 generates one measurement data point when the rotating device 1 is at the initial angular position and is about to start rotating (at an angular position of 0 degrees), generates one measurement data point at the following time instances, namely, when the rotating device 1 has rotated by 15 degrees, by 30 degrees, by 45 degrees, . . . and so on, until the rotating device 1 has rotated by 345 degrees. It is noted that as the rotating device 1 rotates, the RSRP may change, so the values of the resulting measurement data points may be different. Then, the UE 2 generates the first measurement dataset that includes the resulting 24 measurement data points.

In step 42, the UE 2 transmits the first measurement dataset via a feedback signal, and the processor 33 receives the first measurement dataset from the UE 2 via the feedback signal received by the one of the directional antennas 31.

In step 43, the processor 33 determines whether a representative one of the measurement data points (hereinafter also referred to as "representative measurement data point") included in the first measurement dataset indicates that an associated RSRP is in a weak signal range. In embodiments, the weak signal range indicates a signal power no smaller than −100 dBm and no larger than −90 dBm. When the determination is affirmative, it may be deduced that the one of the directional antennas 31 is suitable for performing the handover process, and the flow proceeds to step 45. Otherwise, it may be deduced that the one of the directional antennas 31 needs adjustment on its signal transmission power, and the flow proceeds to step 44.

Figure 5:
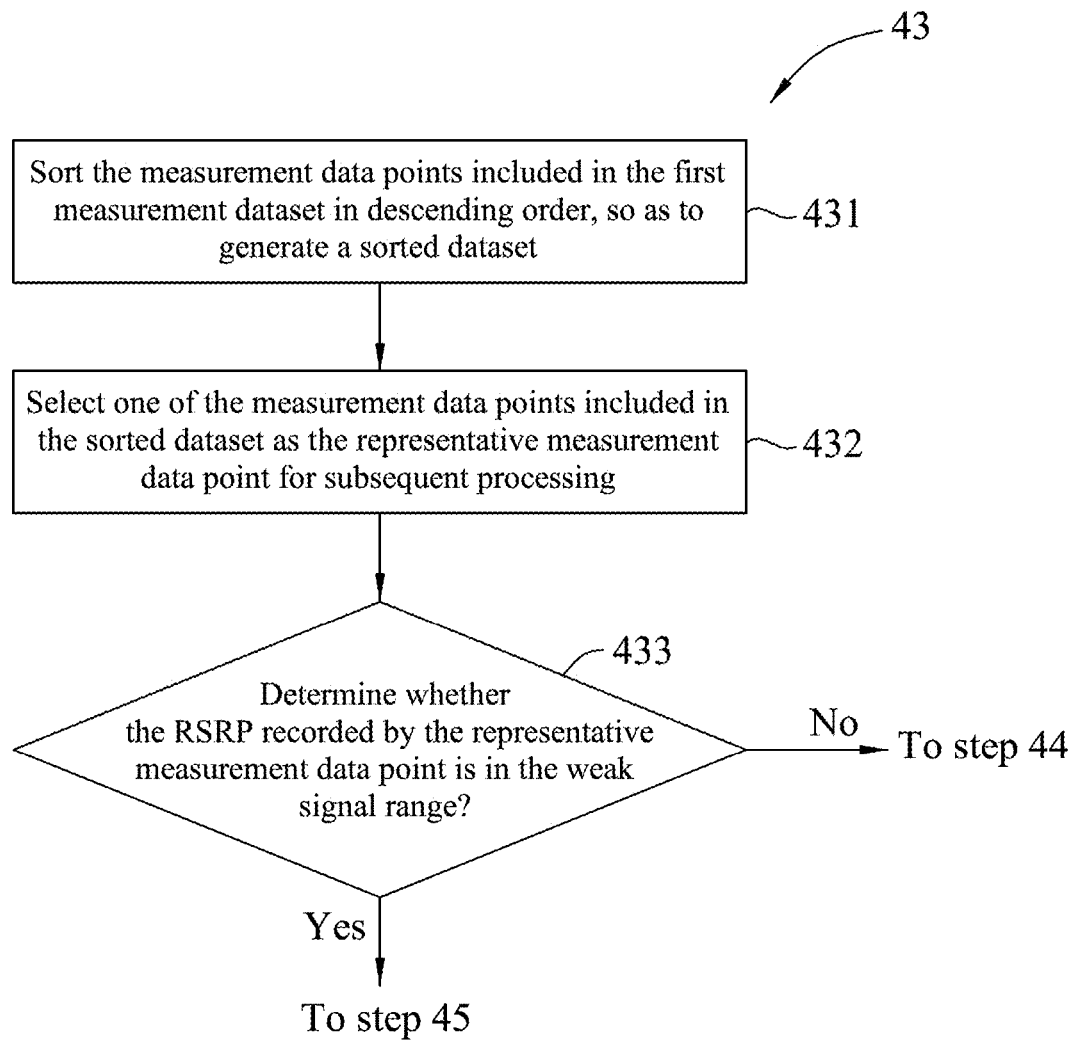
FIG. 5 is a flow chart illustrating the operations for determining whether a representative one of a plurality of measurement data points included in a first measurement dataset indicates that an associated reference signal receiving power (RSRP) is in a weak signal range.

FIG. 5 is a flow chart illustrating the operations included in step 43 according to one embodiment of the disclosure.

In sub-step 431, the processor 33 sorts the measurement data points included in the first measurement dataset in descending order, so as to generate a sorted dataset. In this embodiment, the processor 33 generates the sorted dataset by listing the largest one of the measurement data points as a first entry, followed by a second largest one of the measurement data points as a second entry, a third largest one of the measurement data points as a third entry, and so on.

Then, in sub-step 432, the processor 33 selects one of the measurement data points included in the sorted dataset as the representative measurement data point for subsequent processing. In one embodiment, the processor 33 selects an $(M/N)^{th}$ entry of the measurement data points included in the sorted dataset, which is the sixth (24/4) largest one of the measurement data points in this embodiment, as the representative measurement data point.

In sub-step 433, the processor 33 determines whether the RSRP recorded by the representative measurement data point is in the weak signal range. When the determination is affirmative, the flow proceeds to step 45. Otherwise, the flow proceeds to step 44.

In step 44, the processor 33 adjusts the signal transmission power of the one of the directional antennas 31, and the flow goes back to step 41. In some embodiments, the adjustment is made until the RSRP recorded by the (updated) representative measurement data point (the $(M/N)^{th}$ entry of the measurement data points included in the (updated) sorted dataset) is in the weak signal range. For example, when it is determined that the RSRP recorded by the representative measurement data point is larger than an upper limit of the weak signal range (−90 dBm in this example), the signal transmission power of the one of the directional antennas 31 is then reduced, before going back to step 41 to measure a resulting RSRP again. On the other hand, when it is determined that the RSRP recorded by the representative measurement data point is smaller than a lower limit of the weak signal range (−100 dBm in this example), the signal transmission power of the one of the directional antennas 31 is then increased, before going back to step 41 to measure a resulting RSRP again. The above process may be repeated until the RSRP recorded by the representative measurement data point falls within the weal signal range.

In step 45, the processor 33 identifies an angular position associated with the largest one of the measurement data points in value (i.e., the angular position of the rotating device 1 that results in the largest RSRP), and controls the rotating device 1 to rotate to the angular position. Afterward, the current position of the rotating device 1 may serve as another initial angular position for the subsequent operations.

Figure 6:
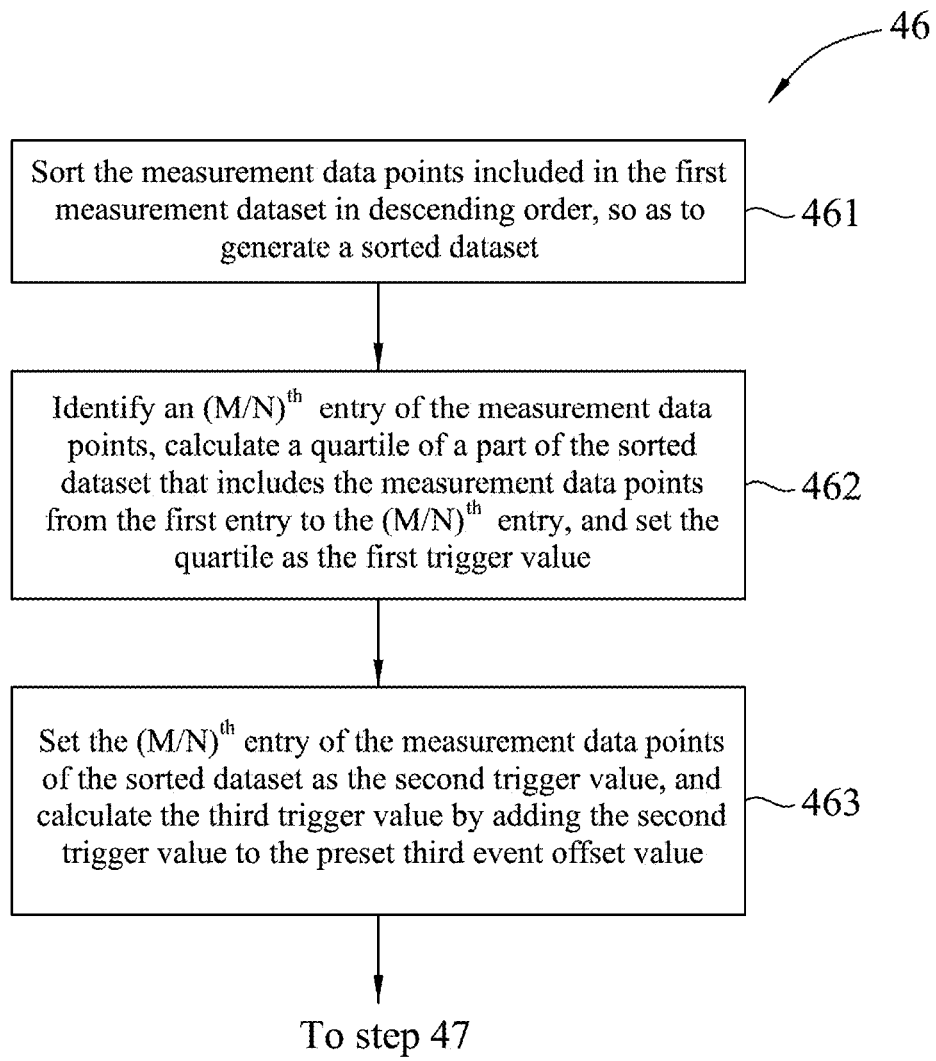
FIG. 6 is a flow chart illustrating the operations for obtaining a first trigger value and a second trigger value, and calculating a third trigger value according to one embodiment of the disclosure.

In step 46, the processor 33 obtains the first trigger value and the second trigger value based on the first measurement dataset, and calculates the third trigger value based on the second trigger value and a preset third event offset value. In this embodiment, the preset offset value equals 3 dB. FIG. 6 is a flow chart illustrating the operations included in step 46 according to one embodiment of the disclosure.

In sub-step 461, the processor 33 sorts the measurement data points included in the first measurement dataset in descending order, so as to generate a sorted dataset. In this embodiment, the processor 33 generates the sorted dataset with the largest one of the measurement data points being a first entry, followed by a second largest one of the measurement data points as a second entry, a third largest one of the measurement data points as a third entry, and so on.

In sub-step 462, the processor 33 identifies an $(M/N)^{th}$ entry of the measurement data points, calculates a quartile of a part of the sorted dataset that includes the measurement data points from the first entry to the $(M/N)^{th}$ entry, and sets the quartile as the first trigger value. Specifically, in one example, the processor 33 identifies the $(M/N)^{th}$ entry of the measurement data points (e.g., the sixth one), calculates a third quartile (e.g., one of the measurement data points that is no larger than 25% of all the measurement data points and that is no smaller than 75% of all the measurement data points included in the part of the sorted dataset), and sets the third quartile as the first trigger value.

In sub-step 463, the processor 33 sets the $(M/N)^{th}$ entry of the measurement data points of the sorted dataset as the second trigger value, and calculates the third trigger value by adding the second trigger value to the preset third event offset value.

After step 46, the flow proceeds to step 47, in which the processor 33 is switched to operate in the handover mode. In the handover mode, the processor 33 controls the signal transceiver unit 32 to activate all of the directional antennas 31, so as to control all of the directional antennas 31 (i.e., the directional antennas 31a, 31b, 31c and 31d) to transmit the RF signals. It is noted that the signal transmission power of the RF signal for each of the directional antennas 31 is based on the signal transmission power as adjusted in step 44.

In step 48, the processor 33 controls the rotating device 1 to perform a partial rotation, in which the rotating device 1 rotates by the preset angle (i.e., 360/N degrees) with a preset angular velocity. It is noted that the base station device 3 is driven by the rotating device 1 to rotate, and therefore the relative positions of each of the directional antennas 31 and the UE 2 change during the rotation. In this embodiment, the processor 33 controls the rotating device 1 to rotate by 90 degrees clockwise with the preset angular velocity.

During the partial rotation, the UE 2 continuously measures the RSRP associated with the RF signal(s) from one or more of the directional antennas 31, and generates a second measurement dataset. In embodiments, the UE 2 continuously measures the RSRP associated with the RF signal(s), and generates a plurality of successive measurement data points. Then, the UE 2 generates the second measurement dataset that includes the successive measurement data points.

Then, in step 49, the UE 2 transmits the second measurement dataset via a feedback signal, and the processor 33 receives the second measurement dataset from the UE 2 via the feedback signal received by one of the directional antennas 31 and the signal transceiver unit 32.

In step 50, the processor 33 transmits a command to the UE 2 to cause the UE 2 to perform one of the first event, the second event and the third event based on the second measurement dataset, the first trigger value, the second trigger value and the third trigger value.

Figure 7:
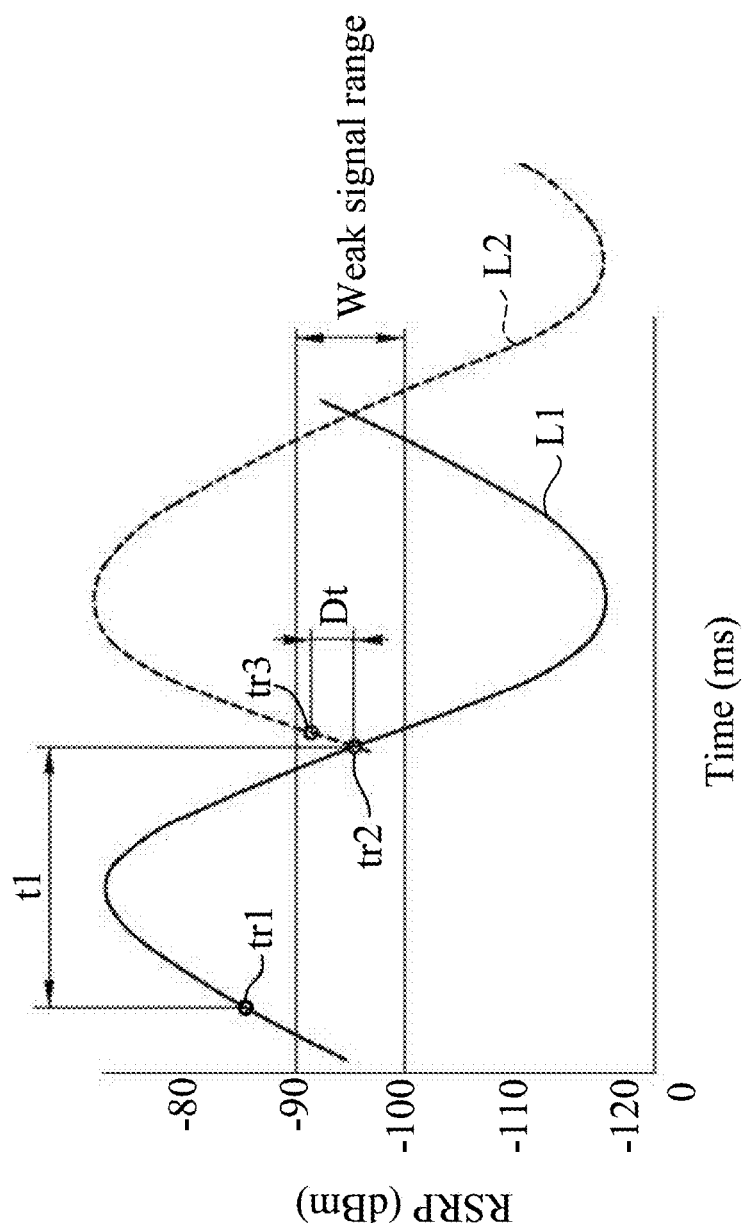
FIG. 7 is a diagram illustrating RSRPs measured by a user equipment during at least one partial rotation of a rotating device.

FIG. 7 is a diagram illustrating RSRPs measured by the UE 2. A segment of the curve L1 indicates the RSRP from the serving cell (i.e., Cell A) measured by the UE 2 during the partial rotation of step 48, as the movement of the directional antennas 31 (and the corresponding cells) results in Cell A being moved away from the UE 2, and Cell B being moved toward the UE 2 to cover the UE 2. A segment of the curve L2 indicates the RSRP from a neighbor cell (e.g., Cell B in this embodiment) measured by the UE 2 during the partial rotation of step 48, as the movement of the directional antennas 31 (and the corresponding cells) results in Cell A being moved away from the UE 2, and Cell B being moved toward the UE 2 to cover the UE 2. In the example of FIG. 7, the waveform of each the curves L1 and L2 may indicate a rotational movement of the rotating device 1 by 90 degrees.

The point tr1 indicates the first trigger value. The point tr2 indicates the second trigger value. The point tr3 indicates the third trigger value. In this embodiment, the second trigger value is smaller than the first trigger value, and the third trigger value is between the first and second trigger values. A difference Dt between the second and third trigger values indicates the preset third event offset value.

In this embodiment, determinations made by the processor 33 to cause the UE 2 to execute one the first event, the second event and the third event in step 50 are implemented as follows.

In the case where it is determined that the second measurement dataset indicates that the RSRP measured by the UE 2 is higher than the first trigger value (that is, the UE 2 is receiving a signal from the serving cell that has a relatively good quality), the processor 33 transmits the command to cause the UE 2 to execute the first event. In turn, the UE 2 is controlled to stop measuring the RSRP of the neighbor cell for a predetermined time period (e.g., the time period t1 as shown in FIG. 7).

In the case where it is determined that the second measurement dataset indicates that the RSRP measured by the UE 2 is lower than the second trigger value (that is, the UE 2 is receiving a signal from the serving cell that has a relatively poor quality), the processor 33 transmits the command to cause the UE 2 to execute the second event. In turn, the UE 2 is controlled to start measuring the RSRP of the neighbor cell. It is noted that in the case where the second event is performed by the UE 2, the content of the resulting second measurement dataset would be different from the case where the first even is performed by the UE 2, because the signal transmission power (e.g., the RSRP) of the neighbor cell is measured and included in the second measurement dataset.

In the case where the RSRP of the neighbor cell included in the second measurement dataset is greater than the third trigger value (that is, a signal from the neighbor cell has a quality better than that of the signal from the serving cell by 3 dB or more), the processor 33 transmits the command to cause the UE 2 to execute the third event. In turn, the UE 2 is controlled to start a handover process, in which the cellular communication of the UE 2 originally served by the serving cell is transferred to the neighbor cell.

It is noted that the duration of the predetermined time period may be different based on the angular velocity of the rotating device 1. For example, there may be three different preset angular velocity settings for the rotating device 1, which, comparatively speaking, are "high," "medium" and "low" angular velocities, when the angular velocity is "high," the predetermined time period may be set at 3 seconds, when the angular velocity is "medium," the predetermined time period may be set at 6 seconds, and when the angular velocity is "low," the predetermined time period may be set at 9 seconds.

In the case where the third event is to be performed, the flow proceeds to step 51, in which while the UE 2 is performing the third event, the processor 33 measures a number of results associated with the handover process of the UE 2, and records a rotation count indicating a number of partial rotation(s) that has(have) been implemented by the rotating device 1. That is to say, each time the rotating device 1 is controlled to perform a partial rotation by 90 degrees, the processor 33 adds the rotation count by 1. In embodiments, the results may include a handover time during which the handover process is implemented and completed, a success rate associated with the handover process during the handover process, etc.

Specifically, in transmitting the command to cause the UE 2 to execute the third event, the processor 33 also transmits a Radio Resource Control (RRC) connection reconfiguration message to the UE 2 for triggering the handover process, and activates a timer (not depicted in the drawings) to calculate the handover time.

In response to receipt of the RRC connection reconfiguration message, the UE 2 starts the handover process, and after the handover process is successful (i.e., the cellular communication of the UE 2 is successfully transferred to the neighbor cell), transmits a connection reconfiguration complete message back to the processor 33 of the base station device 3. In response to receipt of the connection reconfiguration complete message, the processor 33 stops the timer, thereby obtaining the handover time. In the case where no connection reconfiguration complete message is received from the UE 2 after the time measured by the timer exceeds an expected period to handover, the processor 33 determines that the handover process is incomplete, and adds a handover incompletion count by 1.

The expected period to handover may be related to the angular velocity of the rotating device 1. For example, in the case where the angular velocity is "high," the expected period to handover may be 6 seconds, meaning that it is expected that the handover process be triggered within 6 seconds. As such, when it is determined that the handover process does not occur in 6 seconds, the processor 33 determines that the handover process is incomplete, and adds a handover incompletion count by 1. In the case where the angular velocity is "medium," the expected period to handover may be 12 seconds, and in the case where the angular velocity is "low," the expected period to handover may be 18 seconds. It is noted that after being triggered, the handover time typically ranges from about 85 to 115 milliseconds.

Using the rotation count and the handover incompletion count, the processor 33 is configured to calculate the success rate associated with the handover process by calculating a number of successful handover processes (by subtracting the handover incompletion count from the rotation count), and dividing the number of successful handover processes by the rotation count.

In step 52, the processor 33 measures data throughput related to the UE 2 during the handover process, and stores the measured data throughput as one of the results.

After the handover process has completed (indicated by the receipt of the connection reconfiguration complete message) or upon determining that the handover process is incomplete (indicated by the absence of the connection reconfiguration complete message after the time measured by the timer exceeds the expected period to handover), in step 53, the processor 33 determines whether the rotation count has reached a predetermined repetition number. In the case where the rotation count is lower than the predetermined repetition number, the flow proceeds to step 54, in which the processor 33 controls the rotating device 1 to perform another partial rotation with the preset angular velocity. It is noted that at this stage, the relative positions of each of the directional antennas 31 and the UE 2 have changed in comparison with the relative positions in step 48, and therefore identities of the serving cell and the neighbor cell have also changed. Afterward, the flow goes back to step 49 to perform the operations of steps 49 to 53.

On the other hand, in the case where the rotation count has reached the predetermined repetition number, it is determined that the operations of the handover process of the UE 2 have been tested a number of times that equals the predetermined repetition number, and sufficient data has been gathered for examining the handover performance of the UE 2 in the multi-cell environment. As such, the method is terminated, and a result of the method may then be obtained to determine the handover performance.

Figure 8:
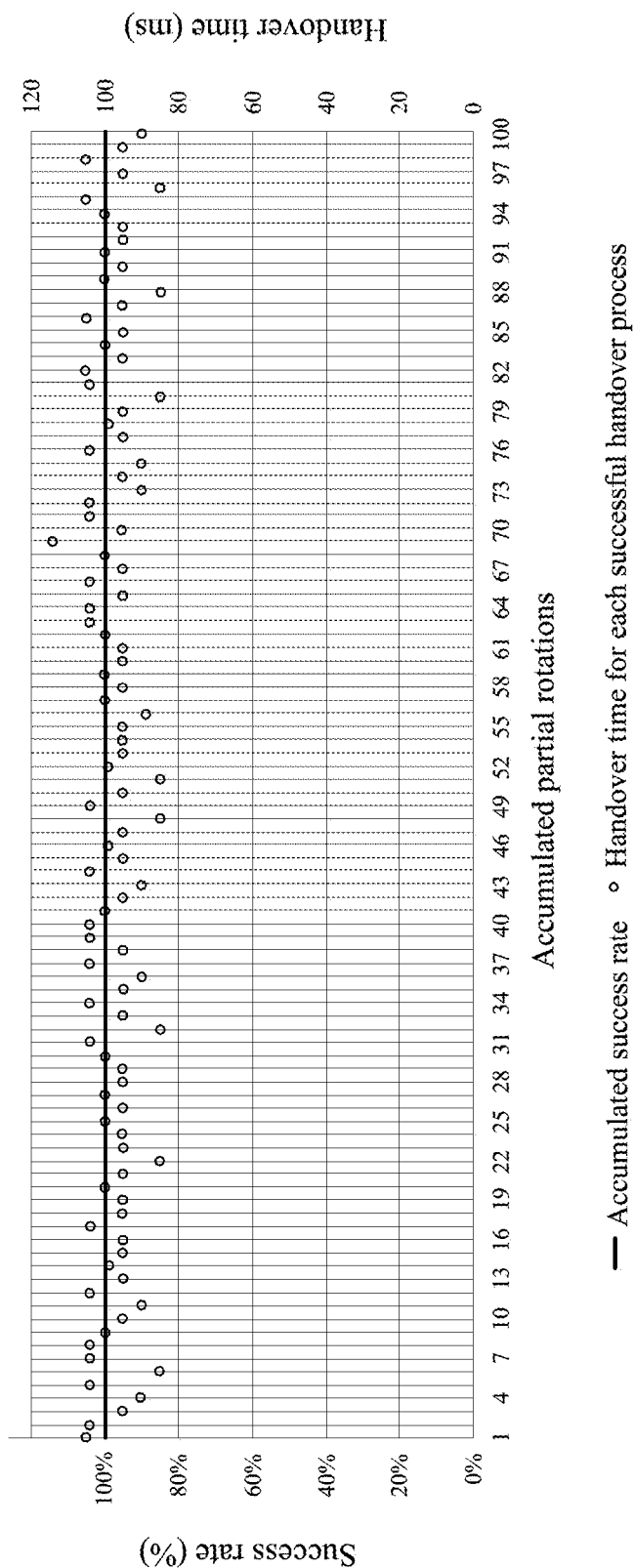
FIG. 8 is a graph that illustrates a result of an exemplary implementation of the above method according to one embodiment of the disclosure.

FIG. 8 is a graph that illustrates a result of an exemplary implementation of the above method according to one embodiment of the disclosure. In this embodiment, positions of the components of the system are set in a manner as shown in in FIG. 2, and the rotating device 1 is configured to rotate at the "low" angular velocity, which may be 5 degrees per second (that is, at the low angular velocity, the rotating device 1 performs one full rotation every 72 seconds). The predetermined repetition number is 100. In use, after the rotating device 1 completes 100 partial rotations (which triggers 100 handover processes, respectively), the resulting success rate (as the number of partial rotations accumulates) and the handover time for each successful handover process may be obtained by the processor 33, and the processor 33 may control the display to display the same in a manner as shown in FIG. 8. By viewing the graph, the person is able to easily determine whether the UE 2 is capable of performing handover normally. It is noted that the above method may be repeated with the rotating device 1 being configured to rotate at different angular velocities or may be repeated under other settings (e.g., using different base station devices 3 with different numbers and/or arrangement of directional antennas 31) to evaluate the handover performance of the UE 2 in different conditions.

Figure 9:
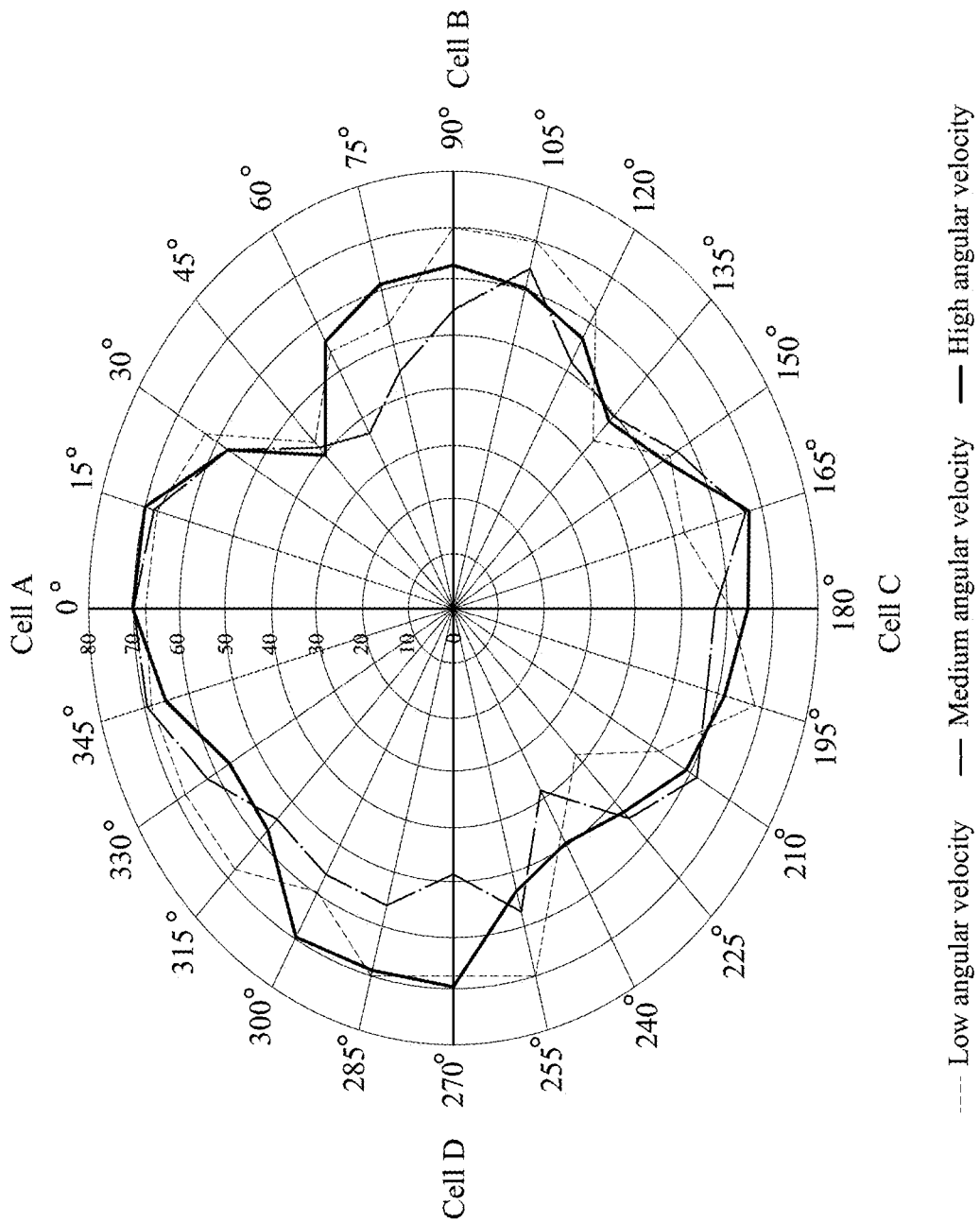
FIG. 9 is a radar chart that illustrates variations in data throughput with respect to different angular positions of a rotating device of the system according to one embodiment of the disclosure.

FIG. 9 is a radar chart that illustrates variations in data throughput with respect to different angular positions of the rotating device 1 according to one embodiment of the disclosure. In the example of FIG. 9, four directional antennas 31 are present and arranged to emit the RF signals in the directions indicated by the angles 0 degrees, 90 degrees, 180 degrees, and 270 degrees, respectively. As such, Cell A roughly covers the area between the line indicating 315 degrees and the line indicating 45 degrees, Cell B roughly covers the area between the line indicating 45 degrees and the line indicating 135 degrees, Cell C roughly covers the area between the line indicating 135 degrees and the line indicating 225 degrees, and Cell D roughly covers the area between the line indicating 225 degrees and the line indicating 315 degrees. Each pair of two adjacent cells may have an overlap area that spans about 15 degrees. In the example of FIG. 9, the overlap area of Cell A and Cell B may be the area between a line indicating 37.5 degrees (not shown) and a line indicating 52.5 degrees (not shown).

Typically, as the rotating device 1 rotates, a handover process will be triggered when the rotating device 1 is rotated to an angular position where the UE 2 is within the overlap area of two adjacent cells, and the data throughput may be lower during the handover process. In use, after the rotating device 1 completes a full rotation (which triggers four handover processes) at one of the three angular velocities, the resulting data throughput during the full rotation may be obtained by the processor 33, and the processor 33 may control the display to display the same as one curve in the radar chart as shown in FIG. 9. By viewing the radar chart, the person is able to easily determine whether the UE 2 is capable of performing data transmission with an expected efficiency (e.g., in the example of FIG. 9, a normal data throughput may be 60-70 million bits per second, Mbps), and whether data transmission has been interrupted during a handover process.

One additional advantage of the radar chart is that the data throughput with respect to three different angular velocities are integrated in one radar chart, so the person can easily compare the performance of the UE 2 in different conditions by viewing the (single) radar chart.

To sum up, embodiments of the disclosure provide a method and a system for automatically measuring a handover performance in a multi-cell environment. In the system, the base station device 3 is disposed on the rotating device 1, which is configured to rotate and drive the directional antennas 31 of the base station device 3 to move along. In the method, the cells created by the directional antennas 31 are moved during the rotation of the rotating device 1, and as a result, the relative positions of each of the directional antennas 31 and the UE 2, which is initially placed within one of the cells, change as well. In this manner, the RSRPs associated with a serving cell and a neighbor cell may change, triggering a handover process of the UE 2. The processor 33 is configured to measure a plurality of results associated with the handover process of the UE 2, including a handover time, a success rate associated with the handover process, data throughput during the handover process, etc. In this manner, the measurement of the handover performance of the UE 2 may be done in an automatic manner using the configuration of the system, and the UE 2 may be placed at a specific spot to remain stationary instead of being held and moved by someone. In some embodiments, since the measurement of the method is done using the system as described above (as opposed to the conventional manual measurement), the system and the environment for the measurement can remain the same in different implementations, and standardized measurement using the method in the embodiments of the disclosure may be achieved since the method can eliminate the potential issues, such as weather conditions, traffic flows, etc., during the conventional measurement that would otherwise cause distortion to the results.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method of automatically measuring a handover performance in a multi-cell environment, the method to be implemented by a system that includes a rotating device, a user equipment (UE) disposed in proximity to the rotating device, and a base station device disposed on the rotating device, the base station device including a number N of directional antennas, a signal transceiver unit and a processor, the number N of directional antennas being associated with a number N of cells, respectively, each of the number N of directional antennas being configured to emit a signal wave beam in a specific direction, the directional antennas being disposed in a manner such that lines defined by the signal wave beams emitted by two adjacent directional antennas form a preset angle of 360/N degrees, N being an integer no smaller than 2, the UE being placed within one of the cells which serves as a serving cell, the rotating device being in an initial angular position when the method commences, the method comprising steps of:
- a) by the processor, controlling the signal transceiver unit to activate one of the directional antennas that is associated with the serving cell, so as to control the one of the directional antennas to transmit a radio frequency (RF) signal;
- b) by the processor, controlling the rotating device to make one full rotation;
- c) by the processor, receiving a first measurement dataset from the UE, the first measurement dataset being associated with a reference signal receiving power (RSRP) of the RF signal measured by the UE, and including a number M of measurement data points, wherein M is an integer and equals 360/m, m represents a rotation angle, and the UE is configured to generate one measurement data point whenever the rotating device rotates by m degrees;
- d) by the processor, obtaining a first trigger value that is associated with triggering of a first event and a second trigger value that is associated with triggering of a second event based on the first measurement dataset, and calculating a third trigger value that is associated with triggering of a third event based on the second trigger value and a preset third event offset value, wherein the first event is where the UE stops measuring an RSRP from a neighbor cell, the second event is where the UE starts measuring the RSRP from the neighbor cell, and the third event is where the UE starts a handover process when it is determined that the RSRP associated with the neighbor cell is equal to or larger than the third trigger value, the neighbor cell being another one of the cells other than the serving cell;
- e) by the processor, controlling the signal transceiver unit to activate all of the directional antennas, so as to control all of the directional antennas to transmit the RF signals;
- f) by the processor, controlling the rotating device to perform a partial rotation, in which the rotating device rotates by the preset angle with a preset angular velocity;
- g) by the processor, receiving a second measurement dataset from the UE, the second measurement dataset being associated with the RSRP of at least one of the RF signals as measured by the UE;
- h) by the processor, transmitting a command to the UE to cause the UE to perform one of the first event, the second event and the third event based on the second measurement dataset, the first trigger value, the second trigger value and the third trigger value;
- i) by the processor, in a case where the command is to cause the UE to perform the third event, measuring a plurality of results associated with the handover process of the UE, the results including a handover time during which the handover process is implemented and completed, and a success rate associated with the handover process.

2. The method as claimed in claim 1, wherein the second trigger value is smaller than the first trigger value, and the third trigger value is between the first trigger value and the second trigger value, and step h) includes:
- in a case where it is determined that the second measurement dataset indicates that the RSRP measured by the UE is higher than the first trigger value, transmitting the command to cause the UE to execute the first event;
- in a case where it is determined that the second measurement dataset indicates that the RSRP measured by the UE is lower than the second trigger value, transmitting the command to cause the UE to execute the second event; and
- in a case where the RSRP from the neighbor cell included in the second measurement dataset is equal to or larger than the third trigger value, transmitting the command to cause the UE to execute the third event.

3. The method as claimed in claim 1, further comprising, between steps c) and d), steps of:
- j) by the processor, determining whether a representative one of the measurement data points included in the first measurement dataset indicates that an associated RSRP is in a weak signal range; and
- k) by the processor, in a case where the determination of step j) is affirmative, identifying an angular position associated with the largest one of the measurement data points in value, and controlling the rotating device to rotate to the angular position.

4. The method as claimed in claim 3, wherein the weak signal range indicates a signal power no smaller than −100 dBm and no larger than −90 dBm, and step j) includes:
- j1) sorting the measurement data points included in the first measurement dataset in descending order, so as to generate a sorted dataset;
- j2) selecting an $(M/N)^{th}$ entry of the measurement data points included in the sorted dataset as the representative one of the measurement data points, wherein M/N is an integer; and
- j3) determining whether the representative one of the measurement data points indicates that an associated RSRP is in the weak signal range.

5. The method as claimed in claim 3, further comprising a step of:
- l) by the processor, in a case where the determination of step j) is negative, adjusting a signal transmission power of the one of the directional antennas, and repeating steps b) and c).

6. The method as claimed in claim 1, wherein step i) further includes recording a rotation count indicating a number of partial rotations that have been implemented by the rotating device, the method further comprising steps of:
- m) by the processor, measuring and storing data throughput associated with the UE during the handover process;
- n) by the processor, after step i), determining whether the rotation count has reached a predetermined repetition number; and
- o) by the processor, in a case where the rotation count is lower than the predetermined repetition number, controlling the rotating device to perform another partial rotation with the preset angular velocity, and repeating step g).

7. The method as claimed in claim 1, wherein step d) includes:
- d1) generating a sorted dataset in descending order based on the first measurement data set, with the largest one of the measurement data points being a first entry;
- d2) identifying an $(M/N)^{th}$ entry of the measurement data points, calculating a third quartile of a part of the sorted dataset that includes the measurement data points between the first entry to the $(M/N)^{th}$ entry, and setting the third quartile as the first trigger value, wherein M/N is an integer; and
- d3) setting the $(M/N)^{th}$ entry of the measurement data points as the second trigger value.

8. A system for automatically measuring a handover performance in a multi-cell environment, comprising:
a rotating device;
a user equipment (UE) disposed in proximity to the rotating device; and
a base station device disposed on the rotating device, the base station device including
a number N of directional antennas,
a signal transceiver unit, and
a processor,
wherein:
the number N of directional antennas are associated with a number N of cells, respectively, each of the number N of directional antennas is configured to emit a signal wave beam in a specific direction, the directional antennas are disposed in a manner such that lines defined by the signal wave beams emitted by two adjacent directional antennas form a preset angle of 360/N degrees, N being an integer no smaller than 2, the UE is placed within one of the cells which serves as a serving cell, the rotating device is initially in an initial angular position;
the processor is configured to control the signal transceiver unit to activate one of the directional antennas that is associated with the serving cell, so as to control the one of the directional antennas to transmit a radio frequency (RF) signal, and to control the rotating device to make one full rotation;
the UE is configured to measure a reference signal receiving power (RSRP) of the RF signal, to generate a first measurement dataset associated with the RSRP of the RF signal measured by the UE, and to transmit the first measurement dataset to the base station device, the first measurement dataset including a number M of measurement data points, wherein M is an integer and equals 360/m, m represents a rotation angle, and the UE is configured to generate one measurement data point whenever the rotating device rotates by m degrees;
the processor is configured to obtain a first trigger value that is associated with triggering of a first event and a second trigger value that is associated with triggering of a second event based on the first measurement dataset, and to calculate a third trigger value that is associated with triggering of a third event based on the second trigger value and a preset third event offset value, wherein the first event is where the UE stops measuring an RSRP from a neighbor cell, the second event is where the UE starts measuring the RSRP from the neighbor cell, and the third event is where the UE starts a handover process when it is determined that the RSRP associated with the nearby cell is equal to or larger than the third trigger value, the neighbor cell being another one of the cells other than the serving cell;
the processor is configured to control the signal transceiver unit to activate all of the directional antennas, so as to control all of the directional antennas to transmit the RF signals, and to control the rotating device to perform a partial rotation, in which the rotating device rotates by the preset angle with a preset angular velocity;
the UE is configured to measure the RSRP of at least one of the RF signals, to generate a second measurement dataset associated with the RSRP of at least one of the RF signals as measured by the UE, and to transmit the second measurement dataset to the base station device; and
the processor is configured to transmit a command to the UE to cause the UE to perform one of the first event, the second event and the third event based on the second measurement dataset, the first trigger value, the second trigger value and the third trigger value, and in a case where the command is to cause the UE to perform the third event, to measure a plurality of results associated with the handover process of the UE, the results including a handover time during which the handover process is implemented and completed, and a success rate associated with the handover process.

9. The system as claimed in claim 8, wherein:
the second trigger value is smaller than the first trigger value, and the third trigger value is between the first trigger value and the second trigger value; and
the processor is further configured to
transmit the command to cause the UE to execute the first event in a case where it is determined that the second measurement dataset indicates that the RSRP measured by the UE is higher than the first trigger value,
transmit the command to cause the UE to execute the second event in a case where it is determined that the second measurement dataset indicates that the RSRP measured by the UE is lower than the second trigger value, and
transmit the command to cause the UE to execute the third event in a case where the RSRP from the neighbor cell included in the second measurement dataset is equal to or larger than the third trigger value.

10. The system as claimed in claim 8, wherein the processor is further configured to:
determine whether a representative one of the measurement data points included in the first measurement dataset indicates that an associated RSRP is in a weak signal range; and
identify an angular position associated with the largest one of the measurement data points in value, and control the rotating device to rotate to the angular position in a case where it is determined that the representative one of the measurement data points included in the first measurement dataset indicates that the associated RSRP is in the weak signal range.

11. The system as claimed in claim 10, wherein the weak signal range indicates a signal power no smaller than −100 dBm and no larger than −90 dBm, and the processor is configured to determine whether the representative one of the measurement data points included in the first measurement dataset indicates that an associated RSRP is in a weak signal range by:
sorting the measurement data points included in the first measurement dataset in descending order, so as to generate a sorted dataset;
selecting an $(M/N)^{th}$ entry of the measurement data points included in the sorted dataset as the representative one of the measurement data points, wherein M/N is an integer; and
determining whether the representative one of the measurement data points indicates that an associated RSRP is in the weak signal range.

12. The system as claimed in claim 11, wherein the processor is further configured to adjust a signal transmission power of the one of the directional antennas in a case where it is determined that the representative measurement data point indicates that an associated RSRP is not in the weak signal range.

13. The system as claimed in claim 8, wherein the processor is further configured to measure and store data throughput associated with the UE during the handover process.

\* \* \* \* \*